United States Patent [19]

Ono

[11] Patent Number: 4,598,300

[45] Date of Patent: Jul. 1, 1986

[54] IMAGE BUILDING APPARATUS

[75] Inventor: Ken'ichi Ono, Kawasaki, Japan

[73] Assignee: Kabushiki Kaisha Toshiba, Kawasaki, Japan

[21] Appl. No.: 735,434

[22] Filed: May 17, 1985

[30] Foreign Application Priority Data

May 19, 1984 [JP] Japan ................................ 59-100262
May 21, 1984 [JP] Japan ................................ 59-102304
May 30, 1984 [JP] Japan ................................ 59-112130

[51] Int. Cl.[4] .............................................. G01D 15/10

[52] U.S. Cl. ................................ 346/76 PH; 346/106; 346/136; 400/120

[58] Field of Search ................ 346/76 PH, 76 R, 105, 346/106, 136; 400/120, 224.2, 240.3-240.4; 219/216 PH; 250/319

[56] References Cited

U.S. PATENT DOCUMENTS 4,496,955 6/1985 Maeyama et al. ............. 346/76 PH
4,517,590 5/1985 Nagashima et al. ........... 346/76 PH
4,532,525 7/1985 Takahashi ...................... 346/76 PH

*Primary Examiner*—E. A. Goldberg
*Assistant Examiner*—A. Evans
*Attorney, Agent, or Firm*—Schwartz, Jeffery, Schwaab, Mack, Blumenthal & Evans

[57] ABSTRACT

An improved image building apparatus for building color image on paper by transfering thereto a plurality of coloring agents on thermal transfer ribbon by means of a thermal head while reciprocably conveying paper by rotating a platen is disclosed. To assure that paper is firmly held on the surface of the platen the apparatus includes two groups of thrust rollers and a printing head actuating mechanism for displacing the printing head toward and away from the platen. Thus, reciprocably movable paper is brought in close contact with the surface of the platen at least at two points under the effect of thrust force given by the thrust rollers and the printing head without occurrence of dislocation of color transference and the area where no image is built at both the leading and tail ends of paper can be minimized. Further, to assure that paper is smoothly conveyed while it is wound partially about the platen the apparatus is provided with a pair of paper guide members at the position located in the proximity of the thrust rollers while a properly determined distance is maintained between the platen and the paper guide members. A pair of thermal transfer ribbon guide members are formed integral with the printing head so as to allow thermal transfer ribbon to extend therebetween in the stretched state.

18 Claims, 32 Drawing Figures

IMAGE BUILDING APPARATUS

BACKGROUND OF THE INVENTION

1. Field of the Invention

The present invention relates to an image building apparatus and more particularly to improvement of or relating to an image building apparatus for building color image on material to be image transferred by transfering thereto a plurality of coloring agents on thermal transfer material by means of a printing head while the material to be image transferred is reciprocably displaced at every time when one color has been thermally transferred with the material to be image transferred and the thermal transfer material interposed between the printing head the platen roller in the juxtaposed state.

2. Description of the Prior Art

A heat sensitive transfer recording apparatus will be called as one of the above-mentioned type of apparatuses. The heat sensitive recording apparatus is typically constructed such that color image is built on material to be image transferred (printing medium) by transferring thereto a plurality of coloring agents on transfer material (thermal transfer ribbon) by means of a thermal head while material to be image transferred is reciprocably transported round a platen. When transference is effected, material to be image transferred and transfer material are caused to move through the space as defined between the thermal head and the platen while they are held in the juxtaposed state. At every time when one coloring agent having a certain color has been transferred onto material to be image transferred, they are reciprocably displaced and transferring operations as mentioned above are repeated until a predetermined number of coloring agents are transferred thereto.

However, it is often found with respect to the hitherto known apparatus as described above that such a malfunction as dislocation of color transference takes place at every time when transference of coloring agent having one color is shifted to that of coloring agent having another color while material to be image transferred is reciprocably displaced. This is attributable due to slippage of material to be image transferred on the surface of the platen. To obviate the foregoing problem there was already made a proposal that a pair of thrust rollers are disposed at the position located before and behind the thermal head as seen in the direction of transportation of material to be image transferred in order to assure that material to be image transferred is reciprocably displaced while it is normally clamped between the thrust rollers and the platen.

However, the proposed conventional apparatus has a problem that an area where no image is built on material to be image transferred (both the end parts of material to be image transferred as seen in the direction of transportation of the same) increases, because arrangement is so made that material to be image transferred is reciprocably displaced during color transfering operation whle it is normally clamped between the thrust rollers and the platen.

Further, to assure that material to be image transferred is properly brought to the thrust rollers along the peripheral surface of the platen after it passes through the space as defined between the platen and the thermal head there was made another proposal that the conventional apparatus is provided with a pair of thermal transfer material guide members which are projected toward the platen in the area located between the pair of thrust rollers and thereby transfer material is brought in thrust contact with a part of the peripheral surface of the platen while it is kept in the stretched state by means of the pair of guide members.

In practice, there are raised the following requirements for guide members of the above-mentioned type.

(1) To assure that material to be image transferred is smoothly displaced in the area between the thrust rollers it is preferable that a winding angle of transfer material relative to the platen is determined as large as possible while it is brought in close contact with the peripheral surface of the platen.

(2) The conventional apparatus is not provided with any member in the area located between the thrust rollers and the guide member by means of which material to be image transferred is thrusted against the platen. For the reason it is preferable that the above-mentioned area has a length as short as possible from the veiwpoint of inhibiting an occurrence of dislocation of color transference due to slackening of material to be image transferred in the area.

(3) It is preferable that a distance between the platen and the guide member is determined to such a value that there does not take place malfunction such as slackening of material to be image transferred, clogging of the latter or the like.

In view of the above-mentioned requirements the positional relation of the guide members relative to the platen is a very important thing. It should be noted that this positional relation should not limitatively applied only to the thermal head and thing is same with other type of printing head.

When monochromatic image or multicolor image is built on material to be image transferred by using a thermal head, coloring agent on transfer material is molten under the influence of elevated temperature generated by a number of heating resistors on the thermal head and thus molten coloring agent is then transferred onto material to be image transferred. With respect to the heating resistors it is required that they are arranged in parallel with the axis of the platen and moreover they come in uniform contact with the part where thrust force of the thermal head to be exerted on the platen is maximized . Accordingly, since the positional relation between the platen and the guide member is an important thing as described above, the positional relation of the guide members relative to the heating resistors on the thermal head is also an important thing from the viewpoint of meeting the above-mentioned requirements.

However, the conventional apparatus as descrived above has problems that it is difficult to adjustably locate the position of components constituting the apparatus during manufacturing or at a time of maintaining service and there takes place fluctuation in relative positional accuracy among the components, resulting in operational reliability of the apparatus being reduced.

SUMMARY OF THE INVENTION

Thus, the present invention has been made with the foregoing problems in mind.

It is an object of the invention to provide an improved image building apparatus which assures that color image is built on material to be image transferred without occurrence of malfunction such as slackening or clogging of material to be image transferred in the area located in the vicinity of the platen and dislocation of color transference.

It is other object of the invention to provide an improved image building apparatus which assures that an area where no image is built at both the ends of material to be image transferred as seen in the direction of transportation can be minimized.

It is another object of the invention to provide an improved image building apparatus which is easy to determine the position of guide members and a printing head and has no fluctuation in relative positional accuracy between the guide members and the printing head as well as between the guide members and the platen.

To accomplish the above objects there is proposed according to the invention an image building apparatus for building color image on material to be image transferred by transfering thereto a plurality of coloring agents on transfer material by means of a printing head while reciprocably displacing the material to be image transferred by rotation of a platen, wherein the improvement essentially comprises a platen for reciprocable displacing the material to be image transferred while winding it partially about the platen, a printing head adapted to come in contact with the platen with the transfer material interposed therebetween so as to transfer the plurality of coloring agents on the transfer material onto the material to be image transferred, first and second thrust roller mechanisms including a plurality of first and second thrust rollers disposed before and behind the printing head as seen in the direction of displacing of the material to be image transferred, the first and second thrust rollers being adapted to move toward the platen so as to allow the material to be image transferred to come in contact with the surface of the platen and then move away from the latter, and control means for controlling the first and second thrust roller mechanisms so as to allow the thrust rollers to come in contact with the platen when reciprocably displaceable material to be image transferred is existent between the thrust rollers and the platen.

As will be readily apparent from the above description, characterizing features of the invention consist in that two groups of thrust rollers arranged before and behind the printing head as seen in the direction of transportation of material to be image transferred are adapted to move toward and away from the surface of the platen and moreover actuation of the thrust rollers for bringing them in contact with the platen is controlled when material to be image transferred is existent between the thrust rollers and the platen.

In a preferred embodiment of the invention the apparatus further includes a printing head actuating mechanism for displacing the printing head toward and away from the platen so that the printing head is displaced away from the platen only when material to be image transferred is existent between the first and second thrust rollers and the platen during transportation of the material to be image transferred in the opposite direction. In this case the material to be image transferred is firmly held on the surface of the platen at least at two points thereon with the aid of the first and second thrust rollers and the printing head when it is transported to the position where its leading or tail end is spaced away from the surface of the platen in the area located inwardly of the thrust rollers whereby there hardly takes place dislocation of color transference and moreover the area where no image is built on material to be image transferred can be minimized.

In other embodiment of the invention the apparatus further includes a first guide member for guiding transportation of the material to be image transferred to the contact area between the second thrust rollers and the platen, the material to be image transferred being transported in the discharging direction via the printing head, and a second guide member for guiding transportation of the material to be image transferred to the contact area between the first thrust rollers and the platen, the material to be image transferred being transported in the opposite direction, whereby both the leading and tail ends of the material to be image transferred can be smoothly introduced into the contact area between the thrust rollers and the platen.

In another embodiment of the invention the apparatus further includes a pair of thermal transfer material guide members for allowing the transfer material to extend therebetween in the stretched state whilt it comes in contact with a part of the cylindrical surface of the platen. Preferably, the transfer material guide members are formed integral with the printing head so as to assure improved positional accuracy of the transfer material guide members relative to the platen. With repsect to the positional relation between the transfer material guide members and the platen the minimum distance between the transfer material guide members and the platen is preferably determined more than the thickness of material to be image transferred and substantially same to the latter. Thus, the material to be image transferred can be smoothly transported without occurrence of slackening or the like malfunction while the optimum positional relation is maintained. As method of forming the transfer material guide members integral with the printing head a method of molding the pair of transfer material guide members integral with a cover on the base board of the printing head may be employed, wherein the cover is located opposite to the platen. Alternatively, the pair of transfer material guide members are designed in the roller-shaped configuration and they are rotatably supported by means of a pair of brackets which are fixedly secured to both the ends of the printing head as seen in the longitudinal direction.

According to the invention an occurrence of malfunction such as slackening of material to be image transferred, clogging of the latter or the like in the area located in the vicinity of the platen can be inhibited reliably and the area where no image is built on the material to be image transferred can be minimized at both the ends of the latter as seen in the direction of transportation thereof.

Further, according to the invention determination of the position of the guide members and the printing head is easy to be carried out and there hardly occurs fluctuation in positional accuracy of the guide members relative to the platen. Thus, quality of image can be improved remarkably.

Other objects, features and advantages of the invention will become more clearly apparent from reading of the following description which has been prepared in conjunction with the accompanying drawings.

BRIEF DESCRIPTION OF THE DRAWINGS

The accompanying drawings will be briefly described below.

DESCRIPTION OF THE PREFERRED EMBODIMENTS

Now, the present invention will be described in a greater detail hereunder with reference to the accompanying drawings which illustrate preferred embodiments thereof.

Figure 1:
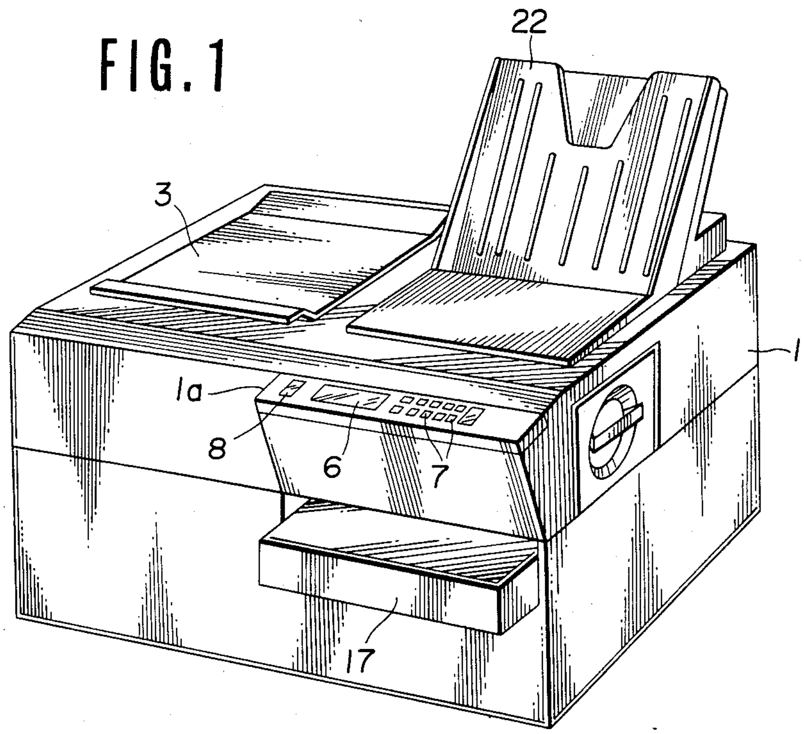
FIG. 1 is a perspective view of an image building apparatus to which the present invention is applied, illustrating apperance of the whole apparatus.
Figure 2:
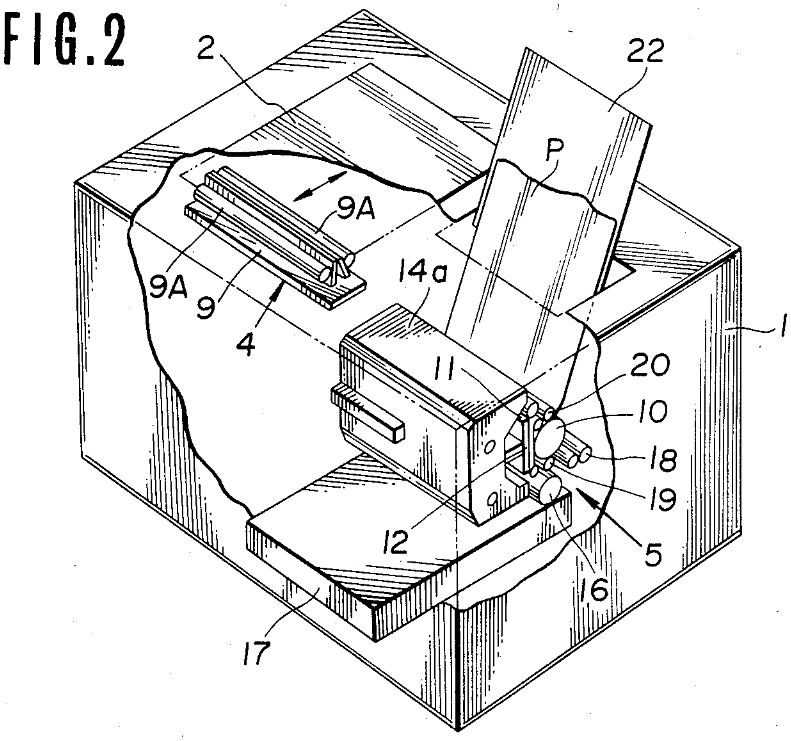
FIG. 2 is a partially exploded perspective view of the apparatus, schematically illustrating the inner structure of the apparatus.
Figure 3:
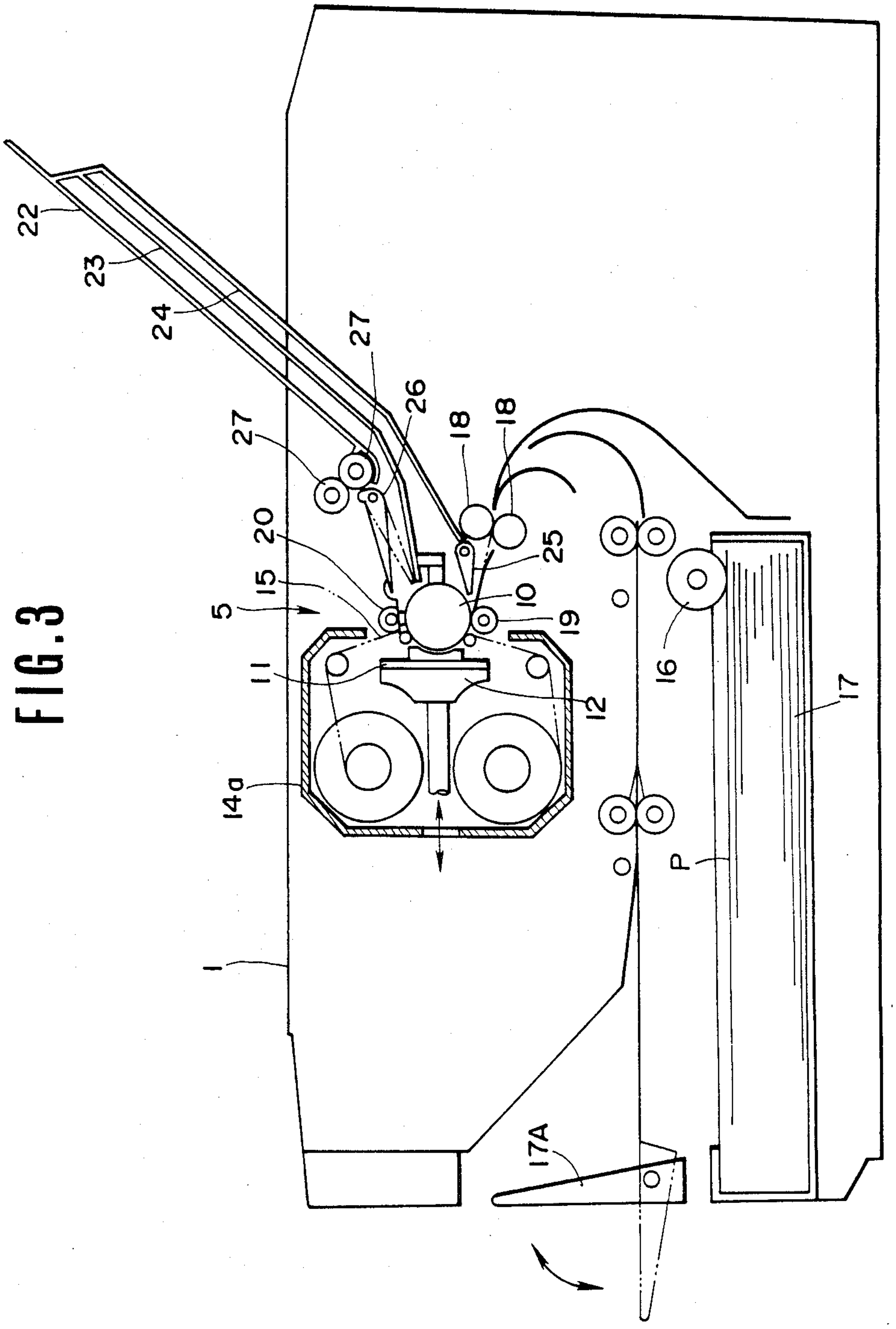
FIG. 3 is a vertical sectional side view of the apparatus in FIG. 1.

FIG. 1 is a perspective view of an image building apparatus to which the present invention is applied, particularly illustrating an appearance of the whole apparatus. FIG. 2 is a partially exploded perspective view of the apparatus in FIG. 1, particularly illustrating the inner structure of the apparatus. FIG. 3 is a vertical sectional view of the apparatus in FIG. 1. As is apparent from the drawings, the apparatus includes a housing 1 and a control board 1*a* is arranged on the upper front wall of the housing 1. Further, the apparatus includes an original platform 2 on the lefthand side of the upper surface as seen in the drawings and an original depressing cover 3 is placed on the original platform 2 to immovably hold an original set on the latter. An original scanning section (scanner section) 4 for scanning the original on the original platform 2 is disposed in the area located below the original platform 2 and the righthand side of the housing constitutes an image building section (printer section) 5.

Specifically, as illustrated in FIG. 2, the original scanning section 4 is so constructed that a movable scanning portion 9 constituting the optical exposure system optically scans the original while moving along the bottom of the original platform 2 and thus obtained optical informations are photoelectrically converted into signals which in turn are inputted into the image building section 5.

A platen 10 is disposed in the substantially middle part of the image building section 5 and moreover a printing head 11 in the form of thermal transfer head (hereinafter referred to simply as thermal head) is disposed at the position located in front of the platen 10 (leftwardly of the latter as seen in FIG. 3) in the spaced relation in such a manner that the former can be displaced toward and away from the latter.

The thermal head 11 is fixedly secured to a holder 12 with a heat radiating board interposed therebetween and a thermal transfer ribbon 15 unwound from the thermal transfer ribbon cassette 14*a* serving as thermal transfer material cassette (hereinafter referred to simply as ribbon cassette) is extended through the space as defined between the platen 10 and the thermal head 11.

Further, a paper feeding roller 16 is disposed at the position located below the platen 10 so that papers P serving as material to be image transferred are taken out of a paper feeding cassette 17 one by one. Paper P thus taken therefrom is transported to a pair of regist rollers 18 which are located above the paper feeding roller 16 so that the leading end of the paper P is correctly oriented by means of the regist rollers 18. Thereafter, the paper P is transported toward the platen 10 until it is wound partially around the latter under the effect of thrust force given by thrust rollers 19 and 20. It should be noted that the apparatus includes a manual paper feeding guide 17A on the front side of the housing 1 so that paper can be manually fed as required.

Figure 4:
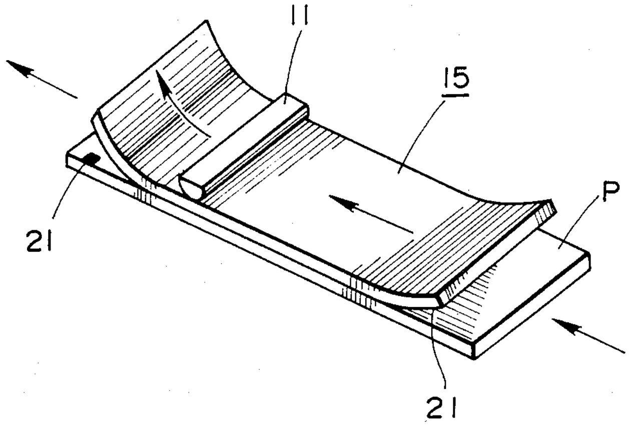
FIG. 4 is a schematic perspective view of thermal transfer ink ribbon and paper, particularly illustrating how color transfering is effected.

The thermal head 11 is adapted to thrust paper P against the platen while the thermal transfer ribbon 15 serving as thermal transfer material is interposed between the thermal head 11 and the paper P. Thus, ink 21 serving as coloring agent on the thermal transfer ribbon 15 is heated up to an elevated temperature and molten ink 21 is then transferred onto the paper P, as illustrated in FIG. 4.

Figure 5:
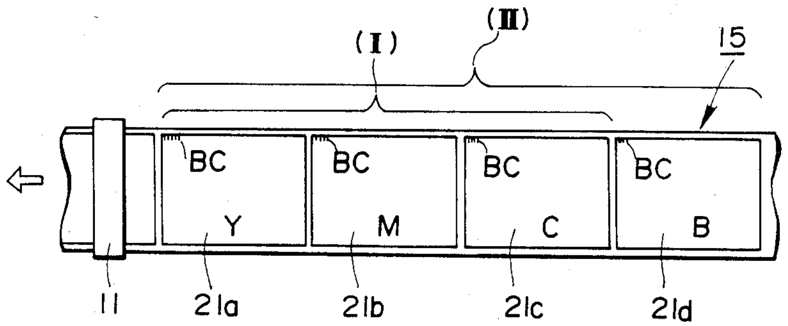
FIG. 5 is a fragmental plan view of the thermal transfer ink ribbon including a plurality of ink sections.

The thermal transfer ribbon 15 includes three ink sections 21*a*, 21*b* and 21*c* arranged one after another in the longitudinal direction in the area (I) in FIG. 5. A color of yellow (Y) is allocated to the ink section 21*a*, a color of magenta (M) is allocated to the ink section 21*b* and a color of cyan (C) is allocated to the ink section 21*c*. Alternatively, the thermal transfer ribbon 15 may include four ink section 21*a*, 21*b*, 21*c* and 21*d* arranged one after another in the longitudinal direction in the area (II) in FIG. 5. In this case a color of yellow (Y) is allocated to the ink section 21*a*, a color of magenta (M) is allocated to the ink section 21*b*, a color of cyan (C) is allocated to the ink section 21*c* and a color of black is allocated to the ink section 21*d*. It should be noted that the width of each of the ink sections 21*a*, 21*b*, 21*c* and 21*d* is determined appreciably larger than that of paper P and a bar code BC is printed on the one side of the leading end of each of the ink sections 21*a*, 21*b*, 21*c* and 21*d* as seen in the direction of transportation for two purposes, one of them being such that the leading end of each of the ink sections is correctly located and the other one being to identify a color allocated to each of the color sections.

The thermal transfer ribbon with a black ink section 21*d* added thereto is usually used when there is requirement for exhibiting a color of real black. However, it is found that a color very close to real black can be exhibited without any use of black ink section by superimposing three colors one above another.

Since the apparatus is constructed in the above-described manner, paper P is reciprocably displaced at the same times as the number of colors to be thermally transferred as the platen 10 is rotated. As a result, three or four colors are superimposed one above another on the paper P. It should be noted that the paper P is brought onto first guide 23 or second guide 24 at every time when one color is transferred thereto. As is apparent from FIG. 3, the first guide 23 is disposed below a paper discharging tray 22 in parallel with the latter and the second guide 24 is disposed below the first one.

Next, description will be made below as to reciprocable movement of paper P with reference to FIGS. 6(A) to (D).

Figure 6A:
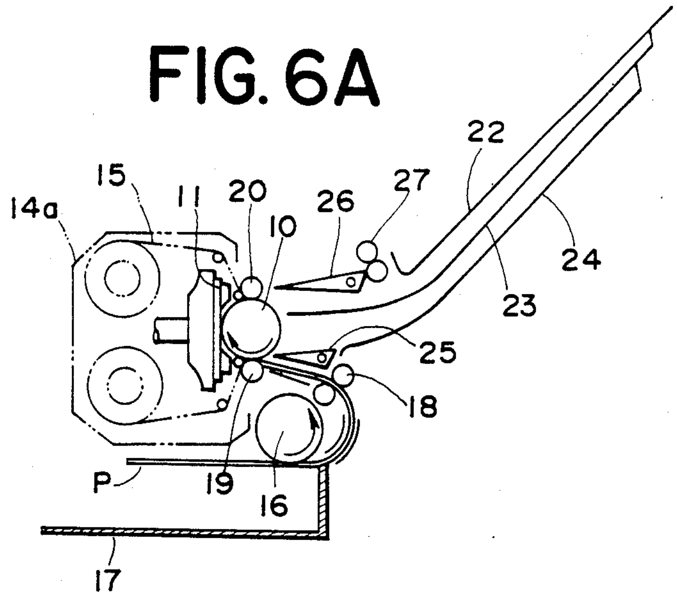
FIGS. 6(A) to (D) are a fragmental vertical sectional side view of the apparatus respectively, illustrating how paper is reciprocably displaced during multicolor transfering operation.

First, paper P taken from the paper feeding cassette 17 is delivered to the platen 10 via the regist rollers 18 and the first distributing guide 25 and it is then wound about the platen 10 (see FIG. 6(A)).

As the platen 10 is rotated by means of a pulse motor (not shown) serving as rotational power source, paper P is displaced at a predetermined speed. At this moment a number of heating elements (not shown) arranged in the dot-line configuration in the axial direction of the platen 10 on the thermal head 11 are heated up to an elevated temperature in response to image informations transmitted thereto whereby ink 21 on the thermal transfer ribbon 15 is transferred onto paper P.

Figure 6B:
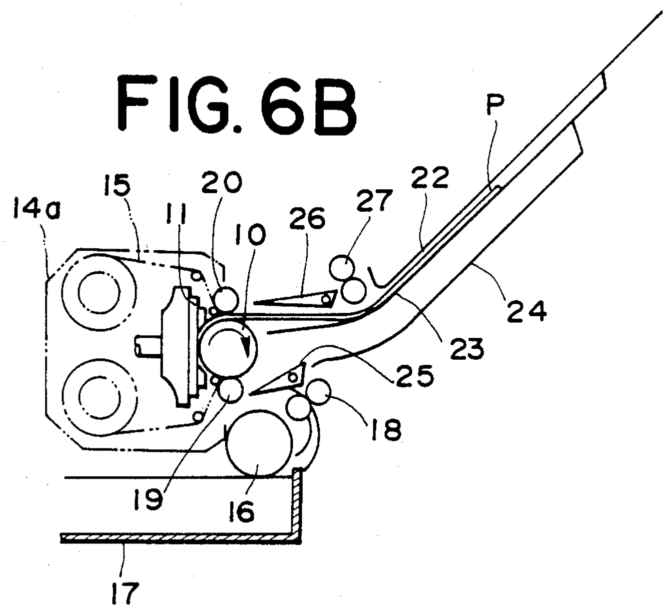

After paper P leaves the platen 10, it is brought onto the first guide 23 extended below the paper discharging tray 22 via the second distributing guide 26 (see FIG. 6(B)).

Figure 6C:
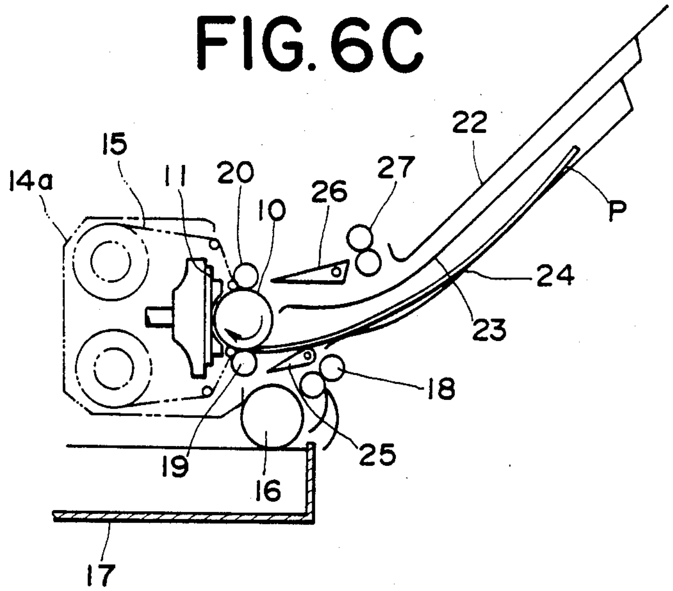

On completion of transference of ink 21 having a certain color to paper P the latter is displaced backwardly by rotating the platen 10 in the opposite direction and it is then brought onto the second guide 24 extended below the first guide 23 via the first distributing guide 25 which has been turned to the illustrated position in the anticlockwise direction as seen in the drawing (see FIG. 6(C)).

Multicolor transference is achieved by reciprocably displacing paper P by several times in the above-described manner.

Figure 6D:
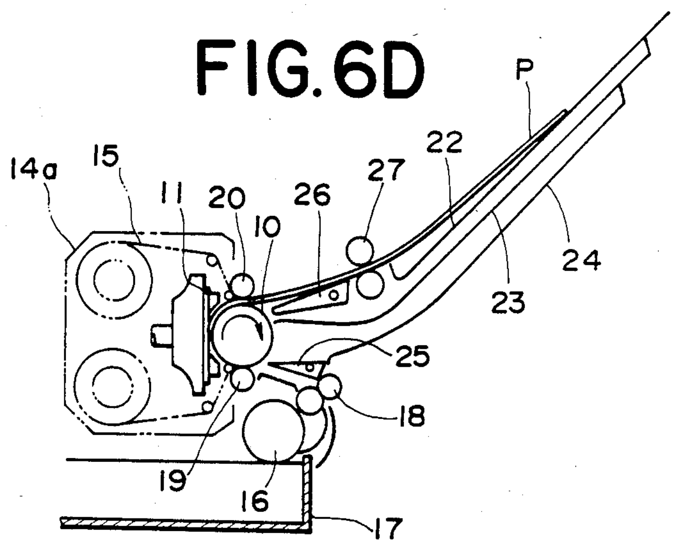

Finally, the paper P with all the colors of inks 21 thermally transferred thereto is brought to a pair of paper discharging rollers 27 via the second distributing guide 26 which has been turn to the illustrated position and it is then discharged onto the paper discharging tray 22 (see FIG. 6(D)).

Figure 7:
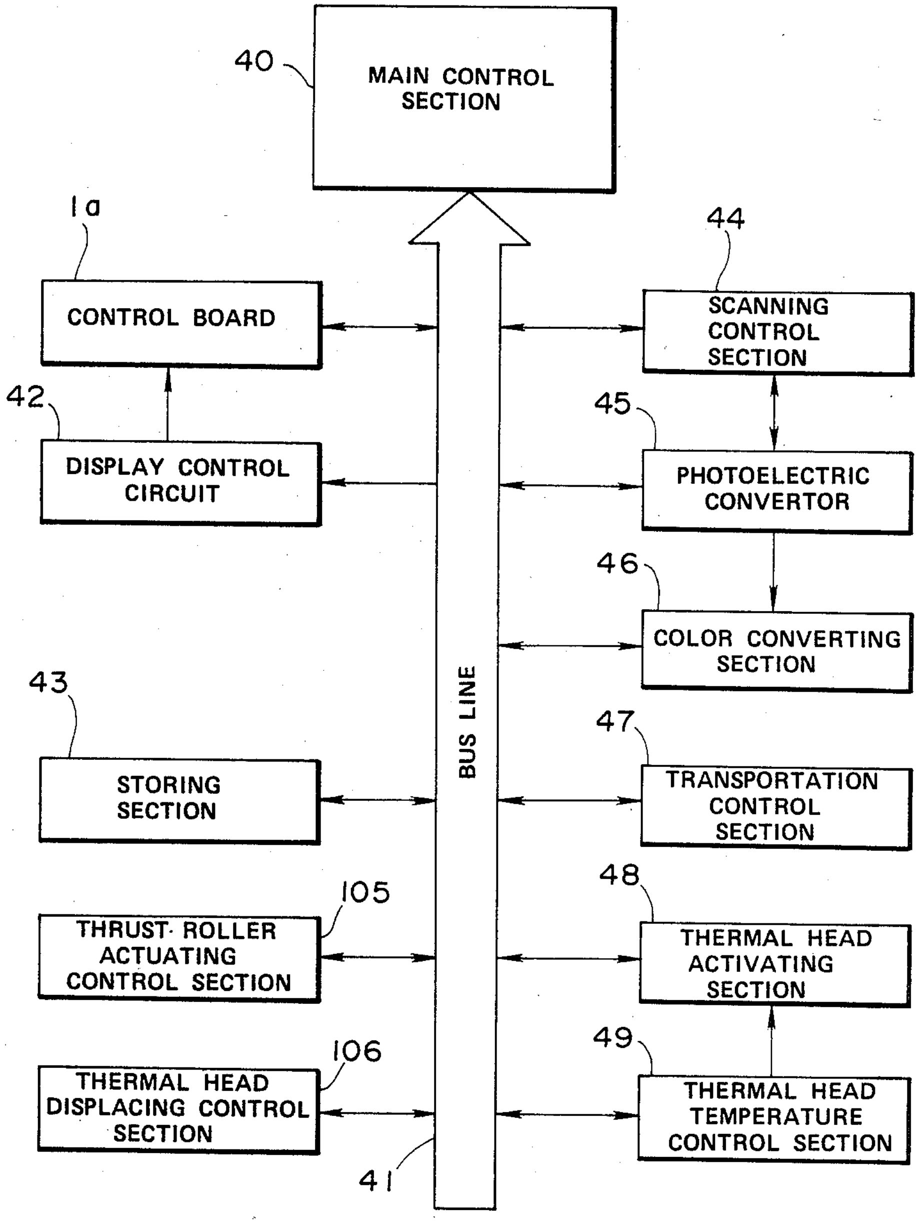
FIG. 7 is a block diagram illustrating arrangement of a control system for the apparatus.

FIG. 7 is a block diagram schematically illustrating a control system for the apparatus. Specifically, in the drawing reference numeral 40 designates a main control section for controlling operations of the whole apparatus. Typically, the main control section 40 is constituted mainly by a central processing unit and its associated components and a bus line 41 is connected to the main control section 40. Further, control board 1*a*, display control circuit 42, storing section 43, scanning control section 44, photoelectric convertor 45, color converting section 46, transportation control section 47, thermal head activating section 48 and thermal head temperature control section 49 are electrically connected to the bus line respectively. The display control circuit 42 is activated in response to signals transmitted from the main control section 40 via the bus line 41 so as to control a display portion 6 on the control board 1*a*. The storing section 43 is activated in response to signals transmitted from the main control section 40 via the bus line 41 so as to store informations transmitted via the bus line 41 or read thus stored informations as required. The scanning control section 44 is activated in response to signals transmitted from the main control section 40 via the bus line 41 so as to control turning-on and -off of a front lamp 9A on the movable scanning portion 9 (see FIG. 2) and actuation of the photoelectric convertor 45 and a motor for scanning operation which is not shown in the drawings. The photoelectric convertor 45 is activated in response to signals transmitted from the main control section 40 via the bus line 41 so as to convert into electrical signals optical signals which have been received corresponding to image on the exposed original. The color converting section 46 is adapted to recieve electrical signals outputted from the photoelectric convertor 45 to process them in such a manner that they are converted into color signals comprising yellow, magenta, cyan and black and thus converted color signals are outputted to the bus line 41. It should be added that the color converting section 46 undertakes color conversion also for signals transmitted from the bus line 41 and then outputs new signals to the bus line 41. The transportation control section 47 is activated in response to signals transmitted from the main control section 40 via the bus line 41 so as to control operation and actuation of a motor for rotating the platen 10, motors for rotating cores of the ribbon cassette 14*a* which are not shown in the drawings, motors for rotating the paper feeding roller 16, the regist rollers 18 and the paper discharging rollers 27 and solenoids for actuating the first and second distributing gates 25 and 26 which are not shown in the drawings. The thermal head activating section 48 is activated in response to singnals transmitted from the main control section 40 via the bus line 41 as well as signals transmitted from the thermal head temperature control section 49 so as to control operation of the heating elements on the thermal head 11. The thermal head temperature control section 49 is adapted to output temperature control signals to the thermal head activating section 48 in response to signals tranmitted from the main control section 40 via the bus line 41. The thrust roller actuation control section 105 is activated in response to signals transmitted from the main control section 40 via the bus line 41 so as to control solenoids 66 and 76 which will be described later to displace thrust rollers 20 and 19 toward and away from the platen 10 (see FIG. 9). Finally, the thermal head displacement control section 106 is activated in response to signals transmitted from the main control section 40 via the bus line 41 so as to displace the thermal head 11 toward and away from the platen 10 by controlling operation of a motor 96 which will be described later (see FIG. 14).

Next, description will be made below as to the platen and its associated components which constitute an essential part of the present invention.

Figure 8:
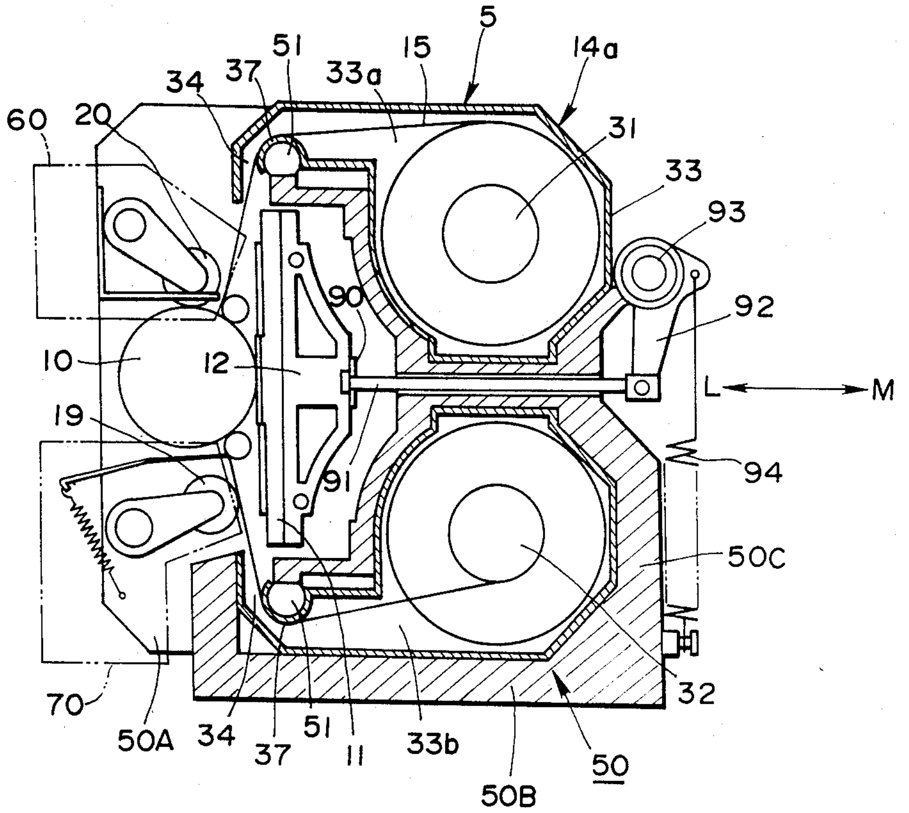
FIG. 8 is a fragmental vertical sectional side view of the apparatus, illustrating essential components disposed in the area located in the vicinity of the platen.

FIG. 8 is a sectional side view illustrating the platen and its associated components. As illustrated in the drawing, the frame 50 is integrally constructed by a combination of side frame 50A, bottom frame 50B and ribbon cassette holding frame 50C adapted to hold the ribbon cassette **14*a* (see also FIG. 11). Further, the side frame 50A has a pair of studs 51 fixedly secured thereto to properly locate the ribbon cassette 14*a* to fit the latter to the ribbon cassette holding frame 50C. The studs 51 extend at a right angle relative to the side frame 50A (in the vertical direction relative to the plane of FIG. 8**).

As is apparent from the drawing, the ribbon cassette **14*a* is so constructed that it includes two cores 31 and 32 extending in parallel with one another so as to allow both the ends of the thermal transfer ribbon 15 to be wound thereabout and the thermal transfer ribbon 15 is incased in the case 33 while a part of the same is exposed to the outside in the area where it is interposed between the platen 10 and the thermal head 11**.

The case 33 is formed with an opposing pair of openings 34 which are opened opposite to one another, while extending in parallel with the axes of the cores 31 and 32 and the opening 34 are in communication with core holding portions **33*a* and 33*b* respectively. Guides 37 having the arch-shaped configuration are formed integral with the case 33 at the position located in the proximity of the openings 34 to smoothly guide reciprocable movement of the thermal transfer ribbon 15. Thus, the studs 51 are fitted into the semicylindrical hollow space as defined by the inner walls of the guides 37**.

A first thrust roller unit 60 is provided in the area located above the platen 10, whereas a second thrust roller unit 70 is provided in the area located below the same.

Figure 9:
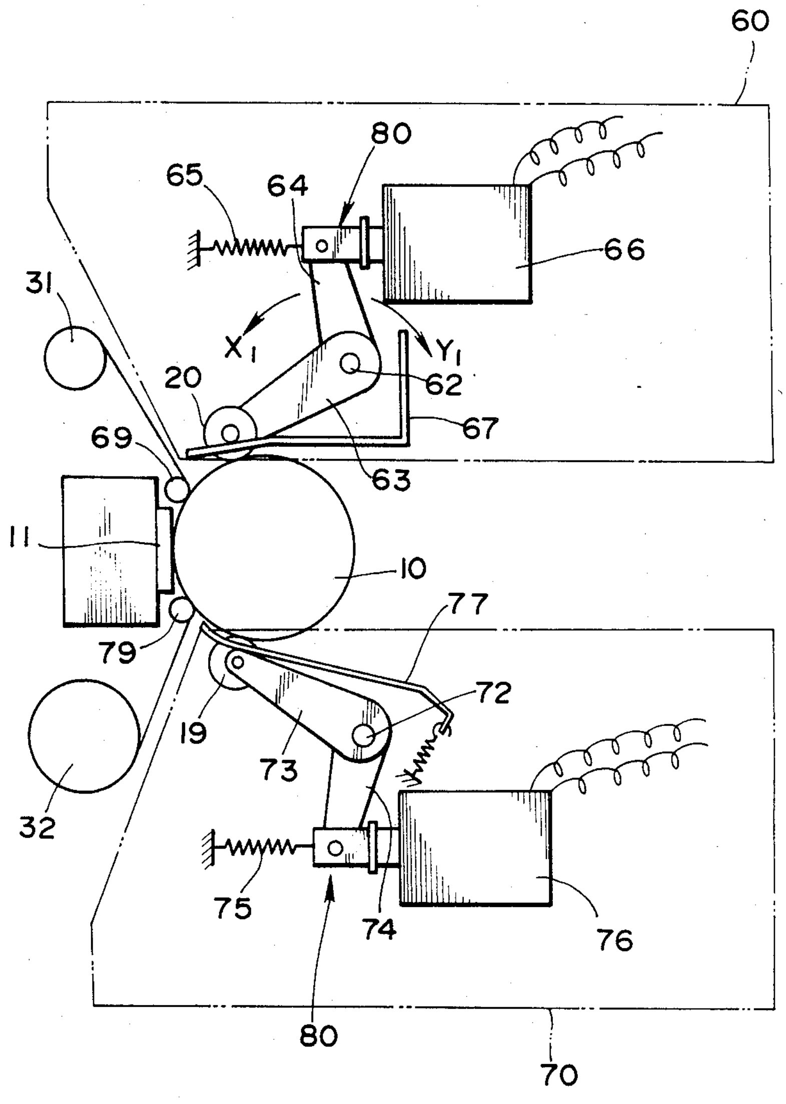
FIG. 9 is a fragmental schematic side view of the apparatus, particularly illustrating two groups of thrust rollers.
Figure 10:
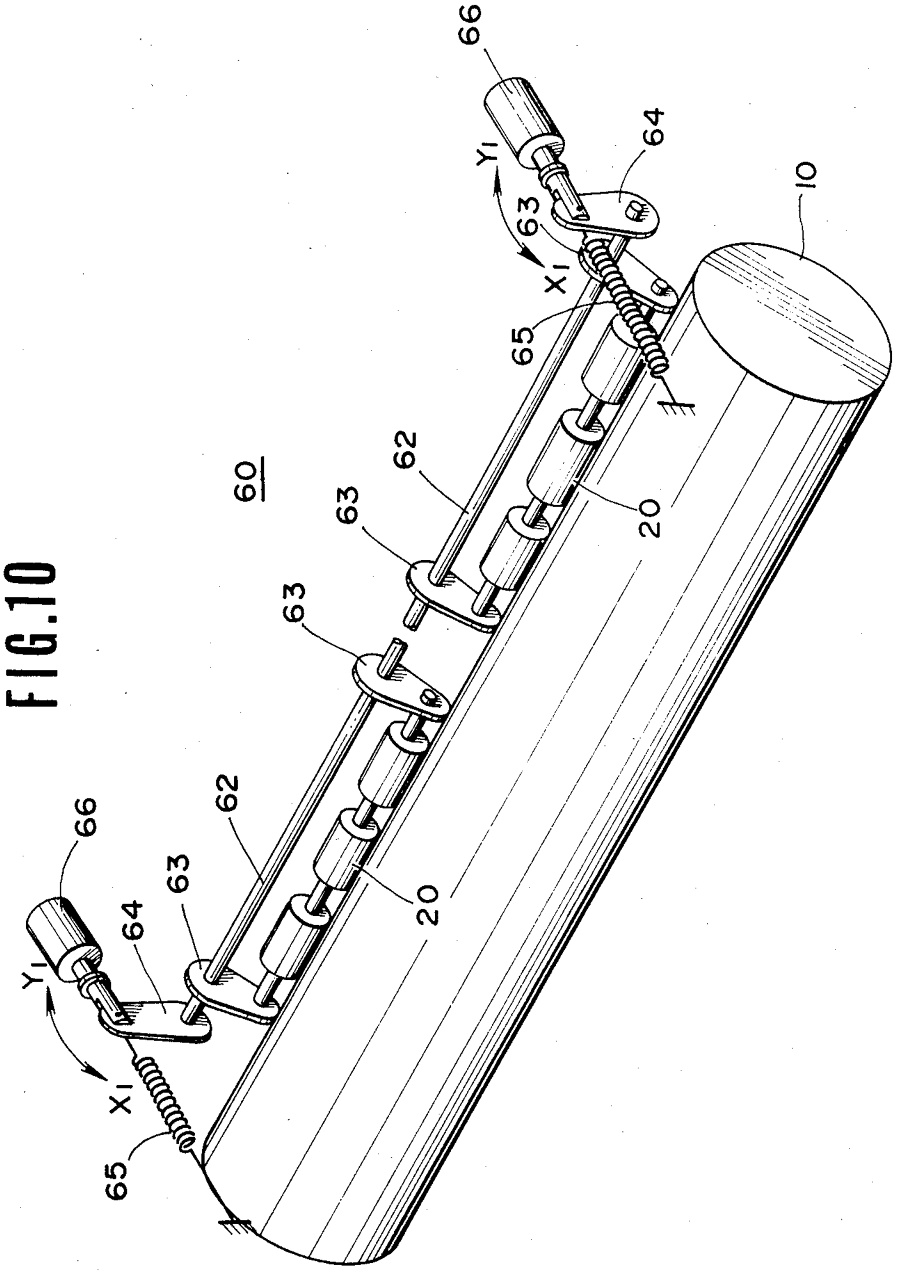
FIG. 10 is a perspective view of the one thrust roller unit.
Figure 11:
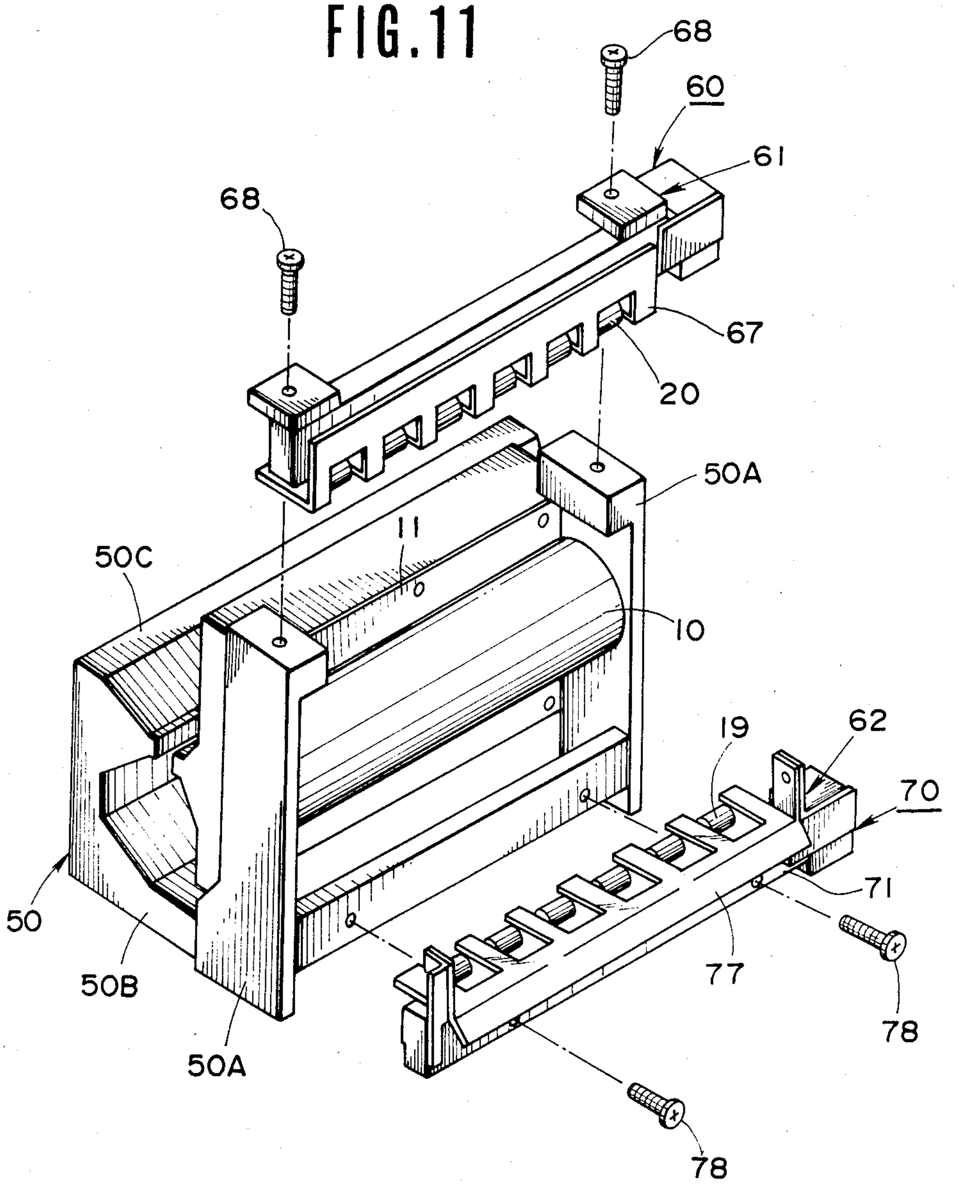
FIG. 11 is a fragmental perspective view of the apparatus, particularly illustrating a pair of thrust roller units in the disassembled state.

Next, description will be made in more details as to the structure and both the units 60 and 70 with reference to FIGS. 9, 10 and 11. It should be noted that FIG. 10 illustrates by way of a perspective view the structure of only the first thrust roller unit 60 for the purpose of simplification of illustration and obviously, the second thrust roller unit 70 is designed and constructed in the same manner as the first one. As illustrated in FIGS. 9 to 11, the first thrust roller unit 60 essentially comprises a bracket 61 for the unit, a shaft 62 rotatably supported on the bracket 61, two pairs of levers 63 fixedly secured to the shaft 62, a plurality of thrust rollers 20 rotatably supported on the free ends of the levers 63, actuating levers 64 fixedly secured to both the ends of the shaft 62, resilient members 65 adapted to turn the actuating levers 64 in the direction as identified by an arrow mark $X_1$ under the effect of resilient force thereof, solenoids 66 for turning the actuating levers 64 in the direction as identified by an arrow mark $Y_1$ against resilient force of the resilient members 65 and a paper guide 67. Incidentally, the solenoids 66 are controlled by the thrust roller actuation control section 105. Before the leading end of paper partially wound about the platen 10 reaches the contact position between the platen 10 and the thrust rollers 20 during operation of the apparatus, the thrust rollers 20 are parted away from the outer surface of the platen 10 by means of the solenoids 66 which are activated in response to signals transmitted from the thrust roller actuation control section 105. On the other hand, when paper is held therebetween, the solenoids 66 are deenergized and thereby the thrust rollers 20 are brought in pressure contact with the outer surface of the platen 10 while paper is clamped therebetween under the effect of resilient force of the resilient members 65 whereby paper can be transported further without an occurrence of slippage. The second thrust roller unit 70 is constructed in the substantially same manner as the first one and essentially comprises a bracket 71, a shaft 72, levers 73, a plurality of thrust rollers 19, actuating levers 74, resilient members 75, solenoids 76 and a paper guide 77. Obviously, the second thrust roller unit 70 operates in the same manner as the first one. As illustrated in FIG. 10, the thrust rollers 20 may be divided into two groups in the axial direction of the platen 10 so that the two groups of thrust rollers are actuated independently. Things are same with the thrust rollers 19. By dividing the thrust rollers 19 and 20 into two groups in that way each of which is actuated independently it is assured that paper is uniformly brought in close contact with the surface of the platen 10 without any occurrence of malfunction such as inclinded movement of paper due to irregular clamping and transporting force, dislocation of color transference due to inclined movement of paper or the like.

As illustrated in FIG. 11, the lower part of each of the the paper guides 67 and 77 is designed in the comb-shaped configuration so as not to inhibit the thrust rollers 19 and 20 from being displaced toward and away from the platen 10.

The thrust roller units 60 and 70 as constructed in the above-described manner can be removably assembled on the frame 50, as illustrated in FIG. 11. Specifically, the first thrust roller unit 60 is detachably engaged to the upper ends of the side frame 50A by means of bolts which are inserted through the bracket 61 and the second thrust roller unit 70 is detachably engaged to the side wall of the bottom frame 50B by means of bolts which are inserted through the bracket 71.

It should be noted that arrangement is made such that the thrust rollers 19 and 20 thrust paper P against the platen 10 in the direction L or L′ at substantially right angle relative to the direction K or K′ of movement of paper P which is wound partially about the platen 10. By virtue of arrangement made in that way there hardly takes place such a malfunction that paper P is inhibited from proper movement when the thrust rollers 19 and 20 come in close contact with it or the leading end part of paper is folded.

Figure 12:
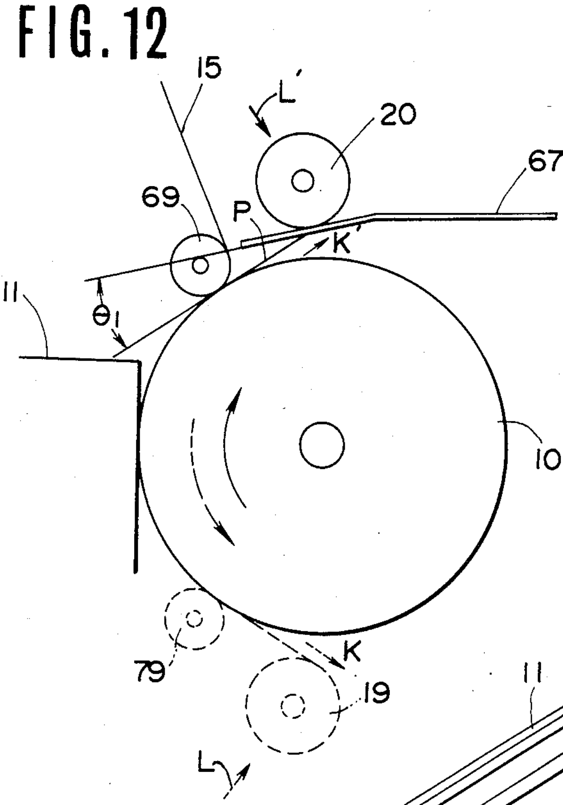
FIG. 12 is a fragmental vertical sectional side view of the apparatus, schematically illustrating an upper paper guide in an enlarged scale.

As is apparent from FIG. 12, to assure that the leading end of paper P is correctly oriented toward the surface of the platen 10 while paper P is inhibited from slacking during transportation of paper P to the thrust rollers 20, an angle $\theta_1$ as defined by the guide surface of the guide 67 and the direction K′ of movement of paper P is determined less than 90 degrees.

Figure 13A:
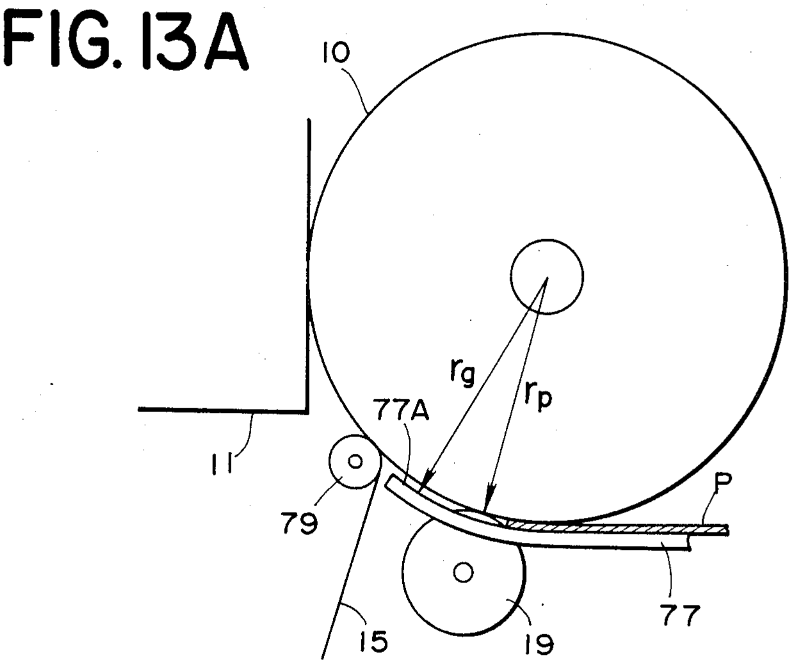
FIGS. 13(A) and (B) are a fragmental vertical sectional side view of the apparatus respectively, schemtatically illustrating a lower paper guide in an enlarged scale.
Figure 13B:
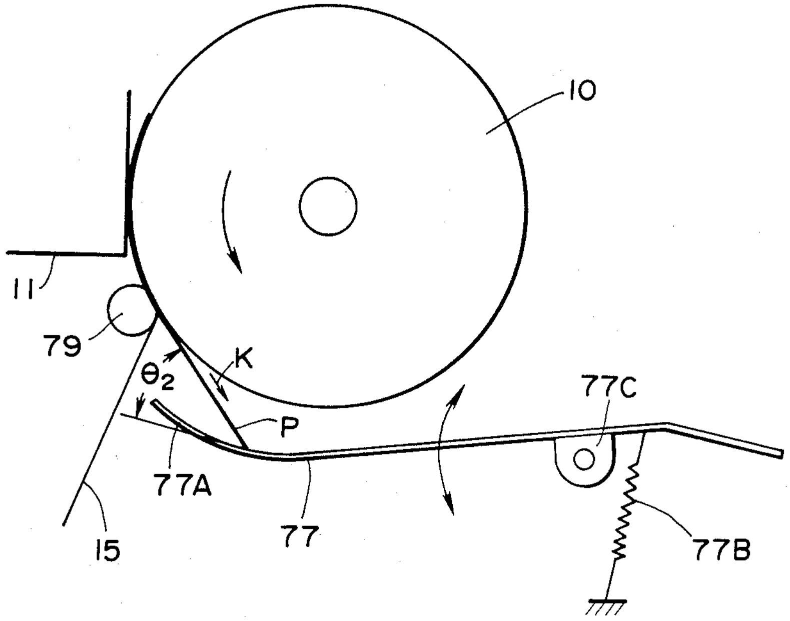

Next, the paper guide 77 is intended to properly guide movement of paper fed from the paper feeding cassette 17 toward the contact position between the thrust rollers 19 and the platen 10 without occurrence of slackening. To this end the fore end part of the paper guide 77 is shaped in the curved configuration 77A of which radius $r_g$ of curvature is determined substantially same to the radius $r_p$ of curvature of the surface of the platen 10 ($r_g > r_p$), as illustrated in FIG. 13(A). Further, the paper guide 77 is supported turnable about the middle part 77C, as illustrated in FIG. 13(B). When it is turned in the clockwise direction as seen in the drawing under the effect of resilient force of a resilient member 77B, it assumed the position as illustrated in FIG. 13(A). When an actuating solenoid (not shown) for actuating the first distributing guide 25 is activated, the paper guide 77 assumes the position as illustrated in FIG. 13(B) by turning movement against resilient force of the resilient member 77B. Particularly, to assure that paper P is properly oriented toward the first distributing guide 25 to smoothly guide backward movement thereof when the paper guide 77 assumes the position as illustrated in FIG. 13(B), an angle $\theta_2$ as defined by the fore end part of paper P and the plane extending in the tangential direction from the contact position is determined less than 90 degrees.

Figure 14:
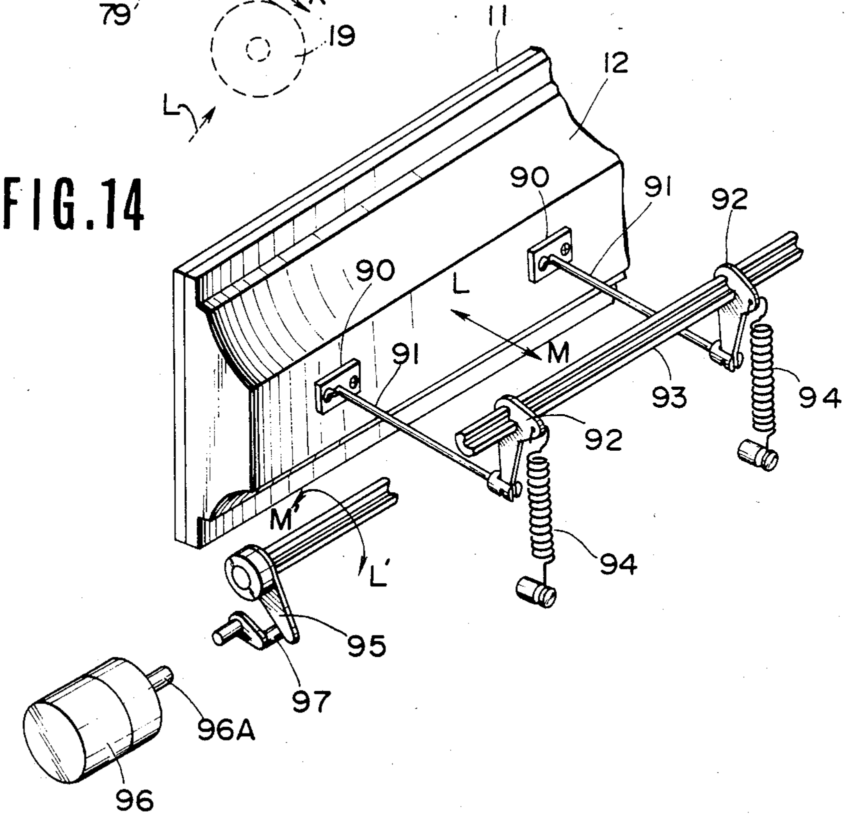
FIG. 14 is a fragmental perspective view of the apparatus, particularly illustrating a thermal head actuating mechanism in the disassembled state.

As illustrated in FIG. 8, the thermal head 11 is so constructed that it moves toward the platen 10 in the direction as identified by an arrow mark L until it comes in contact with the platen 10 to perform thermal transfering operation and moreover it moves away from it in the direction as identified by an arrow mark M when paper P is displaced backwardly. Specifically, as illustrated in FIGS. 8 and 14, the holder 12 has push rods 91 of which one end is secured to attachment plate 90 on the backside thereof. The push rods 91 are slidably inserted through the ribbon cassette holding frame 50C. The other end of each of the push rods 91 is pivotally connected to the free end of each of push levers 92 of which bottom end is engaged to an actuating shaft 93 so as to turn together with the latter. The actuating shaft 93 is rotatably supported on the ribbon cassette holding frame 50C. The push levers 92 are energized to turn about the axis of the actuating shaft 93 under the fffect of resilient force of the resilient members 94 whereby the thermal head 11 moves toward the platen 10 until the former abuts against the surface of the latter. A cam 95 is fixedly secured to the one end of the actuating shaft 93 and the free end of the cam 95 is engaged to a cam roller 97 on the motor shaft 96A of a head driving motor 96 so that the cam 95 is turned in the direction as identified by an arrow mark L' or M' in FIG. 14. The head driving motor 96 is operated under control of the thermal head displacement control section 106 in the above-described manner. Specifically, when the actuating shaft 93 is rotated in the direction as identified by an arrow mark M' as the motor 96 is driven, the thermal head 11 is displaced away from the surface of the platen 10 in the direction as identified by an arrow mark M against resilient force of the resilient members 94. Otherwise, it is normally brought in contact with the platen 10 by its displacement in the direction as identified by an arrow mark L under the effect of resilient force of the resilient members 94.

Next, description will be made as to the structure of the thermal head 11 with reference to FIGS. 15(A) and (B). Specifically, the thermal head 11 includes a base board 11C with a thin film layer of base plate 11B mounted thereon and a number of heating resistors 11A are arranged on the base plate 11B in the dot-shaped or line-shaped configuration. A plurality of switching elements 11D, for instance, IC chips are electrically connected to each bit of the heating resistors 11A via very fine lead wires 11E (by employing the process of wire bonding) so as to turn on and off each bit of the heating resistors 11A. Since the lead wires 11E are very weak in strength and moreover have a very narrow distance between the adjacent ones, their surface is typically coated with silicon resin for the purpose of preventing them from being broken and inhibting an occurrence of contacting between the adjacent ones. Further, in order to protect IC chips 11D from contact with foreign material in the outside area, a cover 100 with a window 100A formed thereon through which the heating resistors 11A are exposed to the outside is immovably attached to the base board 11C by means of a plurality of set screws.

As will be best seen from FIG. 15(B), a pair of guide members 69 and 79 for allowing the thermal transfer ribbon 15 to extend in the stretched state while coming in contact with a part of the cylindrical surface of the platen 10 (hereinafter referred to simply as ribbon guides) are formed integral with the cover 100 on both the sides of the window 100A (extending in the axial direction of the platen 10 on both the sides of the latter).

As will be described later, there is required high positional accuracy of the ribbon guides 69 and 79 relative to the platen 10 and the heating resistors 11A on the thermal head 11. Namely, the heating resistors 11A should be arranged in parallel with the axis of platen 10 while coming in uniform contact with the latter at the position where contact pressure existent between the platen 10 and the heating resistors 11A reaches the highest level. The ribbon guides 69 and 79 should extend in parallel with the axis of the platen 10 and a predetermined distance should be kept between the ribbon guides 69 and 79 and the platen 10 during color transfering operation. Accordingly, the requirement can be satisfactorily met by maintaining the positional accuracy of the thermal head 11 relative to the platen 10, as long as high positional accuracy of the ribbon guides 69 and 79 relative to the heating resistors 11A on the thermal head 11 is kept. For the reason the ribbon guides 69 and 79 are molded integral with the cover 100 for the apparatus of the invention. Further, to facilitate positioning of the cover 100 relative to the base board 11C in the transverse direction, the cover 100 has a longitudinally extending end part which is bent downwardly and thereby an engagement portion 100B for correctly locating the cover 100 relative to the base board 11C is built by engaging the bent portion of the cover 100 to the longitudinally extending side face of the base board 11C.

Figure 16:
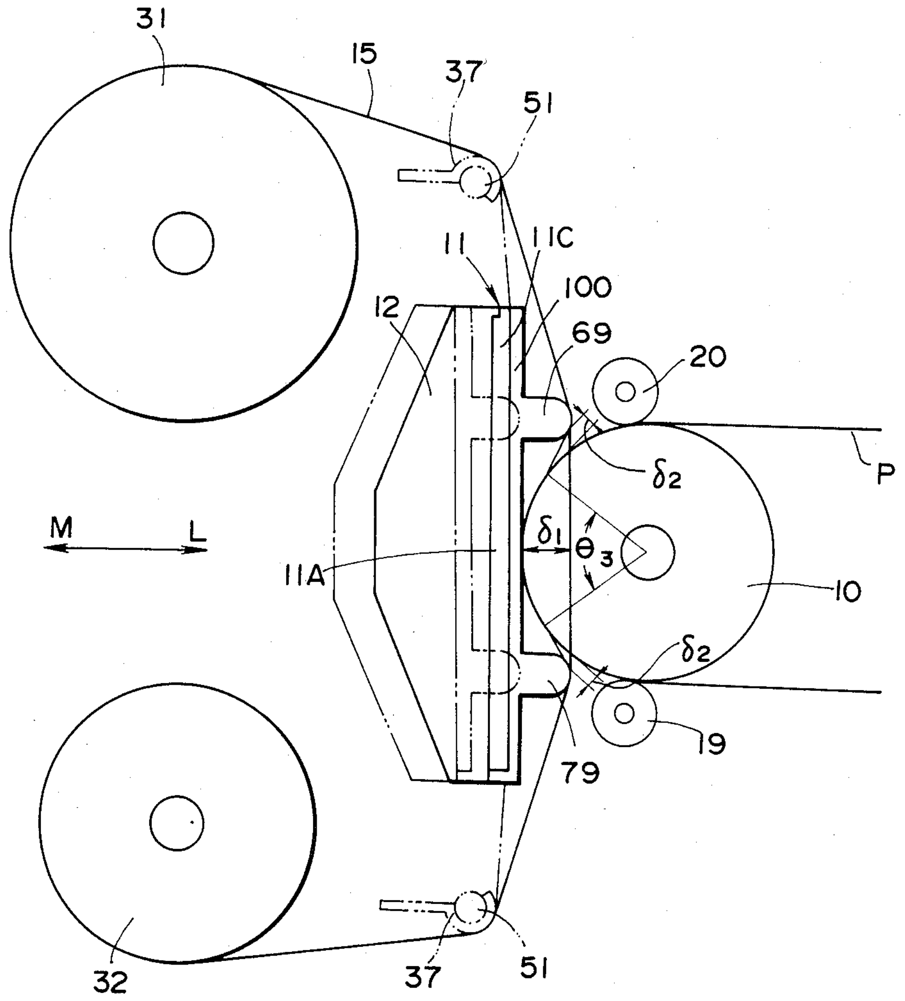
FIG. 16 is a fragmental schematic side view of the apparatus, particularly illustrating the positional relation between the platen and the ribbon guides.

Next, description will be made as to the positional relation between the surface of the platen 10 and the ribbon guides 69 and 79 with reference to FIG. 16. When the push rods 91 are displaced in the direction as identified by an arrow mark L in FIG. 14 under the effect of resilient force of the resilient members, the thermal head 11 assumes the position as represented by real lines in FIG. 16 where the apparatus is ready to effect thermal transfering. On the other hand, when they are displaced in the direction as identified by an arrow mark M by rotation of the thermal head actuating motor 96, it assumes the position as represented by phantom lines in FIG. 16. When the thermal head 11 is displaced to the position as represented by real lines in FIG. 16 where it abuts against the surface of the platen 10, the thermal transfer ribbon 15 comes in close contact with the surface of the platen 10 within the range as defined by a winding angle $\theta_3$. The leading end part of paper P as seen in the direction of transportation cannot be smoothly displaced in the area between the ribbon guide 69 and the thrust rollers 20 or in the area between the ribbon guide 79 and the thrust rollers 19, unless the winding angle $\theta_3$ is determined considerably large. However, when it is determined excessively large, it results that a distance $\delta_1$ as measured from the top edge of the ribbon guides 69 and 79 to the thermal head 11 becomes longer. This leads to a requirement that a stroke of the thermal head 11 as measured in the direction as identified by arrow mark L or M should be increased. Thus, there is existent a certain relation between distance $\delta_1$ and winding angle $\theta_3$. Further, it is obvious that distance $\delta_1$ and winding angle $\theta_3$ are affected by the minimum distance $\delta_2$ between the platen 10 and the ribbon guides 69 and 79. Namely, as the minimum distance $\delta_2$ increases, winding angle $\theta_3$ decreases and there tends to take place slackening of paper P until the latter is brought in close contact with the surface of the platen 10 after its fore end abuts against the thermal transfer ribbon 15. On the contrary, when the minimum distance $\delta_2$ is excessively short, paper P failes to be introduced into the area as defined between the thermal transfer ribbon 15 and the platen 10 and there is a fear of causing clogging of paper in the area, folding of the fore end part of paper or the like malfunction.

In view of the foregoing situation the inventor conducted a variety of experiments with respect to the position which should be assumed by the ribbon guides 69 and 79. As a result, it was found that the optimum value of $\theta_3$ and $\delta_1$ were obtainable when the minimum distance $\delta_2$ was determined more than the thickness of paper P and substantially same to the latter and therefore the optimum positional relation for assuring smooth transportation of paper could be maintained. In the light of the results of the experiments as mentioned above the minimum distance $\delta_2$ is determined in the range of 0.1 to 0.3 mm for the apparatus of the invention, when the thickness of paper P is selected, for instance, in the range of 0.06 to 0.1 mm.

Next, description will be made below as to operation of the apparatus particularly in the area located in the vicinity of the platen 10 and the thermal head 11 during reciprocable movement of paper with reference to FIGS. 17 (A) to (H).

Figure 17A:
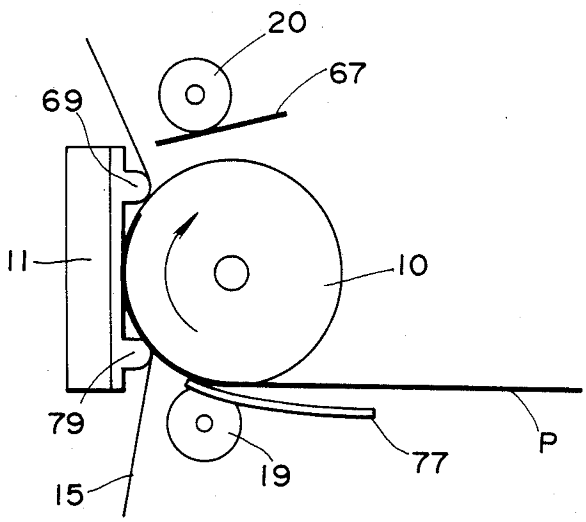
FIGS. 17(A) to (H) are a fragmental side view of the apparatus respectively, particularly illustrating how paper is reciprocably displaced during color transfering operation.

First, when paper P is delivered to the platen 10, the associated components assume their position as illustrated in FIG. 17(A) while the platen 10 is rotated in the clockwise direction as seen in the drawing. Namely, the thermal head 11, the thrust rollers 19 and the paper guide 77 are thrusted against the platen 10 but the upper thrust rollers 19 are parted away from the platen 10. As paper P is transported from the paper feeding cassette 17, it is smoothly introduced into the contact area between the thrust rollers 19 and the platen 10 with the aid of the paper guide 77 as described above with reference to FIG. 13(A). At this moment the minimum distance $\delta_2$ between the ribbon guide 79 and the platen 10 is determined to the dimension as described above with reference to FIG. 16. Thus, paper P is introduced into the area between the thermal transfer ribbon 15 and the platen 10 without any occurrence of malfunction such as folding of the fore end part of paper, clogging, slackening of the same or the like and when it is transported to the illustrated position, the apparatus starts color transfering operation while the thermal head 11 is activated.

Figure 17B:
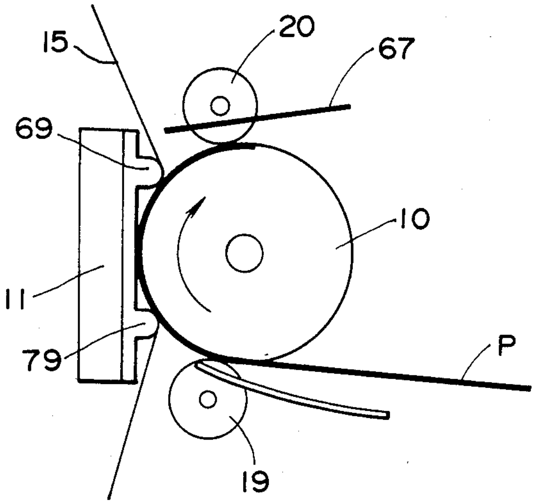
Figure 17C:
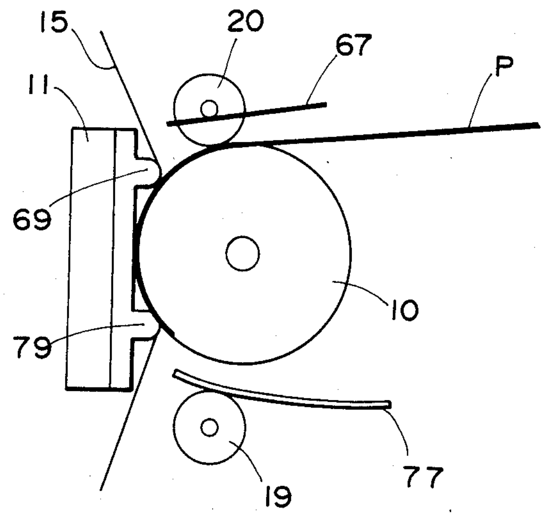

When the leading end of paper P reaches the area between the platen 10 and the thrusting rollers 20, the thrust rollers 20 are caused to move downwardly until they come in contact with the surface of the platen 10 with paper P interposed therebetween, as illustrated in FIG. 17(B). This thrusting operation is initiated during color transfering operation, when the leading end of paper P moves further beyond the line extending through the center of rotation of the platen 10 and the center of rotation of the thrust rollers 20.

When paper P is transported to the position as illustrated in FIG. 17(*c*), the first color transference is finished. Immediately after completion of color transference the platen 10 stops its rotation and the paper guide 77 and the thrust rollers 19 are then parted away from the surface of the platen 10.

Thereafter, the platen 10 is rotated in the reverse direction and thereby backward movement of paper P is initiated. When the leading end of paper P as seen in the direction of backward transportation reaches the area between the platen 10 and the thrust rollers 19, the thrust rollers 19 are caused to move upwardly until they come in contact with the surface of the platen 10 with paper P interposed therebetween as illustrated in FIG. 17(*d*). Subsequently, backward movement of paper P continues further. This movement is initiated when the leading end of paper P moves further beyond the line extending through the center of rotation of the platen 10 and the center of rotation of the thrust rollers 19.

Figure 17D:
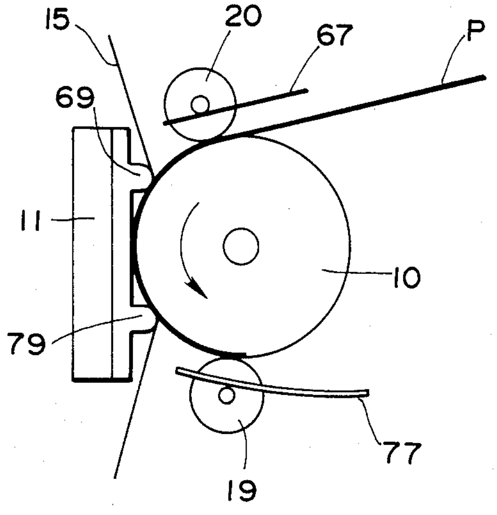
Figure 17E:
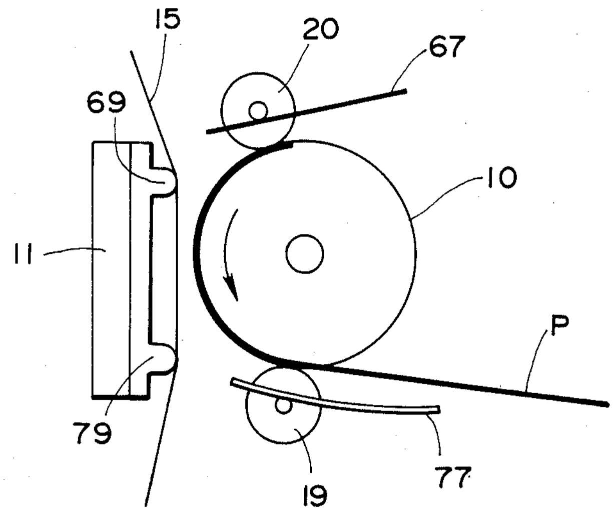

While the thrust rollers 19 come in close contact with the platen 10 with paper P clamped therebetween, the thermal head 11 is parted away from the surface of the platen 10 and when the tail end of paper P reaches the position located just in front of the contact area between the thrust rollers 20 and the platen 10 as illustrated in FIG. 17(E), rotation of the platen 10 is stopped temporarily.

Figure 17F:
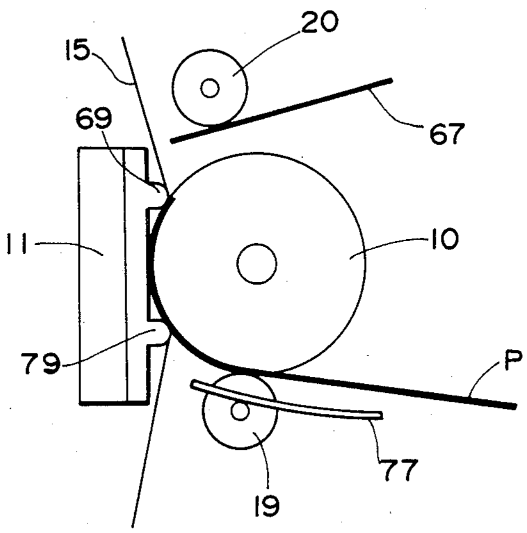

Next, the thermal head 11 is displaced forwardly until it comes in contact with the surface of the platen 10 and thereafter backward movement of paper P is initiated again by rotating the platen 10 in the opposite direction. When the tail end of paper P moves past the area between the thrust rollers 20 and the platen 10, the thrust rollers 20 are parted away from the surface of the platen 10 as illustrated in FIG. 17(F) and backward movement of paper P is then stopped.

Figure 17G:
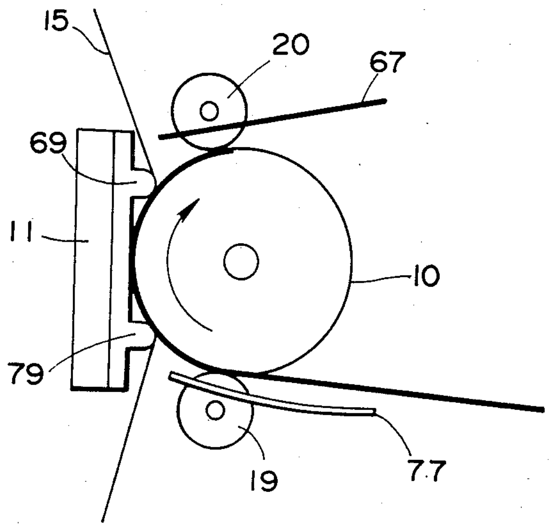
Figure 17H:
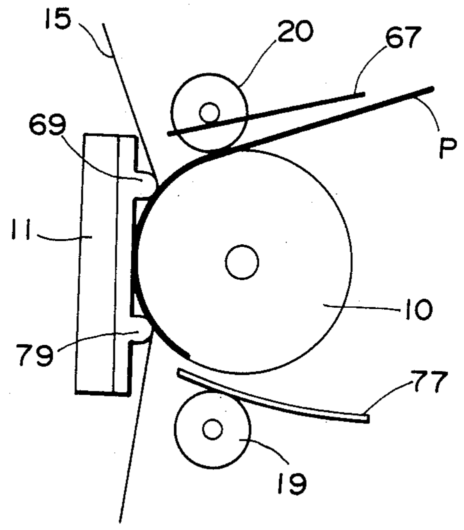

The second color transference to paper P is initiated while paper P is transported forwardly and when the leading end of paper P as seen in the direction of forward movement moves further beyond the line extending through the center of rotation of the thrust rollers 20 and the center of rotation of the platen 10 as illustrated in FIG. 17(G), the thrust rollers 20 are displaced downwardly until they come in contact with the surface of the platen 10. Thereafter, when paper P is transported to the position as illustrated in FIG. 17(H), the second color transference is finished. Thus, by repeating the steps of operations as illustrated in FIGS. 17(D), (E), (F), (G) and (H) all kinds of coloring agents are thermally transferred to paper P. It should be noted that after completion of the first color transference the paper guide 77 is kept away from the platen 10 so that the leading end of paper P to be transported backwardly is smoothly brought onto the guide 24 (see FIG. 6).

As will be apparent from the above description, the apparatus of the invention is so constructed that the thrust rollers 19 and 20 and the thermal head 11 are displaced toward and away from the platen 10 in dependence on the transporting condition of paper P so that paper P is thrusted against the surface of the platen 10 by means of the thermal head 11 without fail, even when either of the leading and tail ends of paper as seen in the direction of transportation is not subjected to thrusting effected by means of the thrust rollers 19 and 20. Thus, an occuurrence of dislocation of color transferrence is reliably inhibited without necessity for normally thrusting paper P against the surface of the platen 10 with the aid of both the groups of the thrust rollers 19 and 20. As a result, color transference is achieved to the extreme position located close to both the leading and tail ends of paper and moreover the inoperative area where no image is built on paper (located on both the ends as seen in the direction of transportation of paper P) can be minimized.

Other advantageous feature of the apparatus of the invention is that there is no fear of folding the leading end of the paper and therefore transportation of paper is achieved without any hindrance encountered, because the thrust rollers 19 and 20 serve to thrust paper P against the surface of the platen 10 at a substantially right angle relative to the direction of transportation of paper P. Further, since the thrust rollers 19 and 20 are divided into two groups in the axial direction of the platen 10, it is assured that paper is brought in close contact with the surface of the platen 10 uniformly and reliably at any position on the surface of the latter without occurrence of inclined movement and snake motion of paper.

Another advantageous feature of the apparatus of the invention is that there is no fear of folding the leading end of paper transported from the paper feeding cassette, because the minimum distance $\delta_2$ between the ribbon guides 69 and 79 and the platen 10 is determined more than the thickness of paper. Further, since the minimum distance $\delta_2$ is determined considerably long compaired with the thickness of paper P, there is no fear of causing paper to be slackened before paper P is brought in close contact with the surface of the platen 10 after the leading end of paper P abuts against the thermal transfer ribbon 15. Obviously, this contributes to image building being achieved without undesirable dislocating of color transference.

Further another advantageous feature of the apparatus of the invention is that the ribbon guides 69 and 79 can be easily located relative to the heating resistors 11A on the thermal head 11, because they are molded integral with the cover 100. As a result, only a requirement is to remove the thermal head 11 during the process of manufacturing the apparatus, at a time of repairing operation or maintaining operation or the like operation. Thus, there is no necessity for adjusting the position of the ribbon guides 69 and 79 relative to the thermal head 11 and therefore there does not take place fluctuation in positional accuracy of the ribbon guides 69 and 79 relative to the thermal head 11. Further, the distance $\delta_2$ between the ribbon guides 69 and 79 can be properly maintained at all time while the thermal head 11 comes in close contact with the platen 10 during color transfering operation, as long as the cover 100 is mounted at a predetermined dimensional accuracy at the predetermined position relative to the thermal head 11. Accordingly, fluctuation in relative positional accuracy among the platen 10, the thermal head 11 and the ribbon guides 69 and 79 can be minimized whereby reliability for building a high quality of image can be improved. Since the ribbon guides 69 and 79 are molded integral with the cover 100, the apparatus can be constructed by the reduced number of components.

While the present invention has been described above with respect to a single preferred embodiment, it should of course be understood that it should not be limited only to this but various changes or modifications may be made in any acceptable manner without departure from the spirit and scope of the invention as defined by the appended claims.

Figure 18:
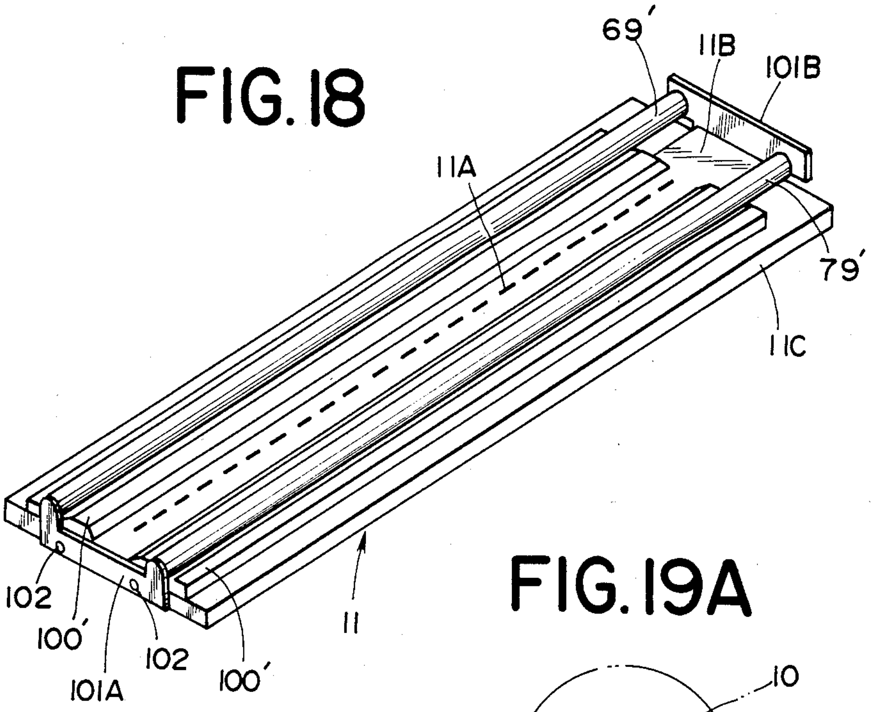
FIG. 18 is a perspective view of the thermal head with a pair of ribbon guide mounted thereon in accordance with other embodiment of the invention, and FIGS. 19(A) and (B) are a side view of the thermal head In FIG. 18 respectively.
Figure 19A:
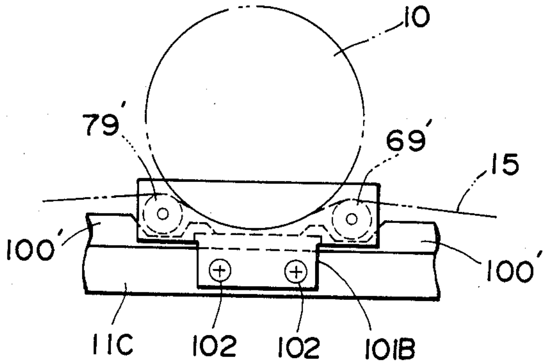
Figure 19B:
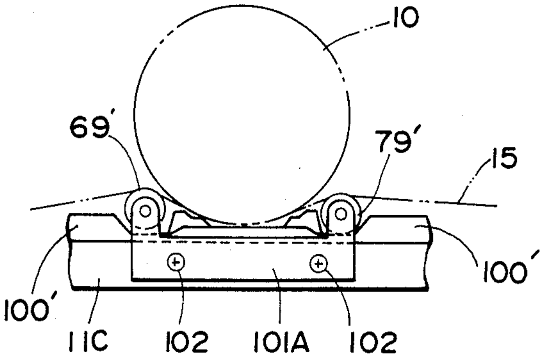

For instance, the integral structure of the ribbon guides and the thermal head should not be limited only to the illustrated one. Alternatively, it may be designed as illustrated in FIGS. 18 and 19. In this embodiment a pair of guide members for allowing the thermal transfer ribbon 15 to extend in the stretched state while coming in close contact with a part of the cylindrical surface of the platen 10 are designed in the form of roll-shaped ribbon guides 69' and 79'. To rotatably support the ribbon guides 69' and 79' on the thermal head 11 the base board 11C has brackets 101A and 101B fixedly secured to both the ends thereof as seen in the longitudinal direction. Thus, the ribbon guides 69' and 79' are assembled integral with the thermal head 11. In this embodiment the brackets 101A and 101B are attached to the side walls of the base board 11C by means of a plurality of set screws 102 so that the position of attachment of the brackets 101A and 101B can be easily adjusted as required. Further, the cover 100 in the foregoing embodiment is modified such that it is divided into two covers 100' for protection IC chips. In spite of the modifications made in that way it is easy to locate the ribbon guides 69' and 79' relative to the thermal head 11. For instance, in the case of determining the minimum distance $\delta_2$ between the platen 10 and the ribbon guide 69' or 79', fine adjustment can be effected by way of the steps of inserting a thickness gauge having a predetermind thickness into the clearance as defined therebetween and then tightening screws 102 while the thermal head 11 is forcibly thrusted against the platen 10.

Figure 15A:
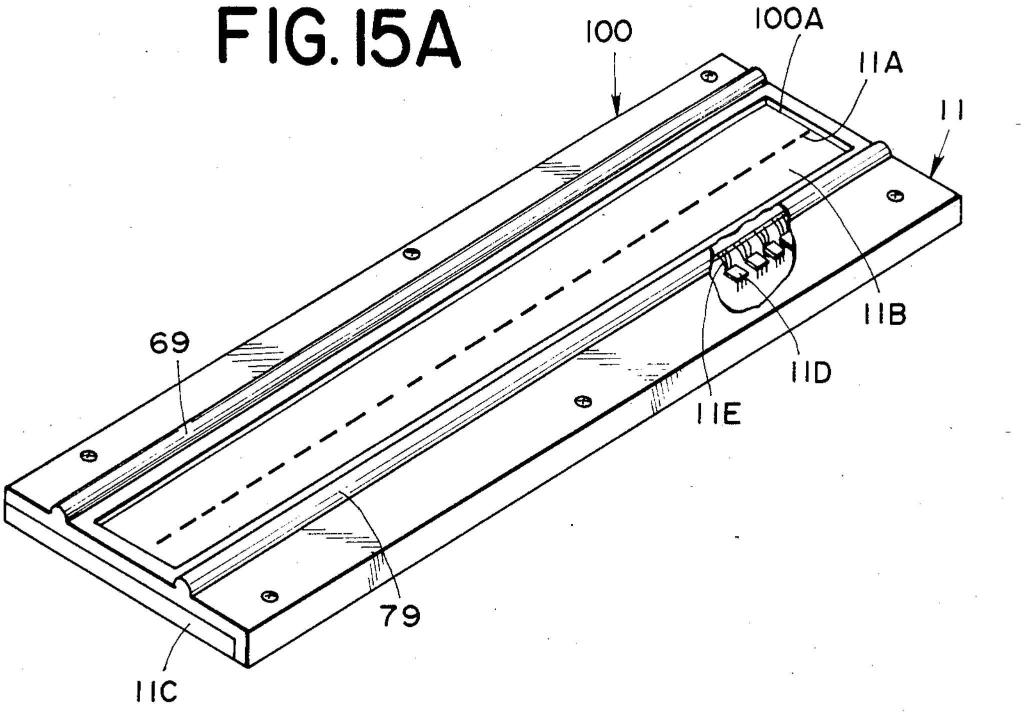
FIG. 15(A) is a perspective view of the thermal head with a pair of ribbon guides formed integral therewith.
Figure 15B:
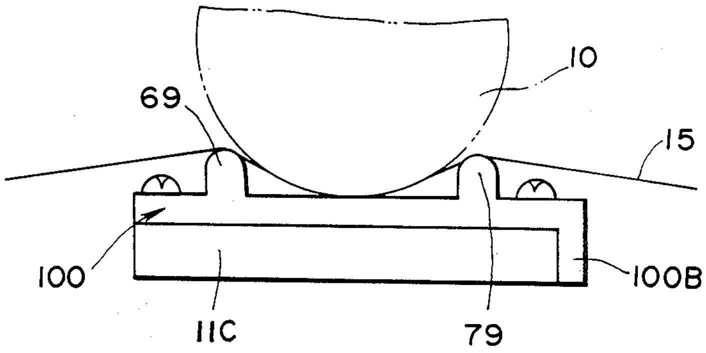
FIG. 15(B) is a side view of an assembly of the thermal head and the ribbon guides in FIG. 15(A).

In the first mentioned embodiment the engagement mechanism for locating the base board 11C relative to the cover 100 is designed as illustrated in FIGS. 15(A) and (B). However, the present invention should not be limited only to this. Alternatively, it may be constructed such that projections on the cover 100 are engaged to corresponding recesses on the base board 11C.

Further, guide members for allowing the thermal transfer material to extend in the stretched state while it comes in close contact with a part of the cylindrical surface of the platen should not be limited only to the illustrated structure where they are molded integral with the base board of the thermal head. Alternatively, they may be fixedly supported on the thermal head by utilizing properly designed frames or the like members. Further, a mechanism for displacing the thrust rollers toward or away from the platen should not be limited only to the illustrated one. Further, a printing head should not be limited only to the illustrated thermal head. It may be replaced with a wire-dot type of printing head.

What is claimed is:

1. In an image building apparatus for building color image on printing medium by transfering thereto a plurality of coloring agents on transfer material by means of a printing head while reciprocably displacing the printing medium by rotation of a platen, the improvement comprising;

- a platen for forwardly and backwardly conveying the printing medium by the rotation of said platen while winding it partially about said platen,
- a printing head which comes in contact with the platen with the transfer material and the printing medium interposed therebetween so as to transfer the plurality of coloring agents on the transfer material onto the printing medium, first and second thrust roller mechanisms including first and second thrust rollers disposed upstream and downstream of said printing head as seen in the direction of conveying of the printing medium, said first and second thrust rollers moving toward the platen so as to secure the contact of the printing medium with the surface of the platen, and control means for controlling said first and second thrust roller mechanisms so as to allow the thrust rollers to come in contact with the platen when the reciprocably conveyed printing medium is existent between the thrust rollers and the platen.

2. An image building apparatus as defined in claim 1, wherein each of said first and second thrust roller mechanisms is so constructed that the thrust rollers come in thrust contact with the platen at a substantially right angle relative to the direction of conveying of the printing medium.

3. An image building apparatus as defined in claim 1, wherein each of said first and second thrust roller mechanisms is divided into a plurality of units each of which is actuated independently.

4. An image building apparatus as defined in claim 3, wherein said each of the units comprises first and second rollers for thrusting the printing medium against the surface of the platen, a pair of first levers for rotatably supporting said thrust roller on one end sides thereof, a shaft to which the other end of said levers are fixedly secured, a second lever which is fixedly secured to said shaft, a resilient member for turning the second lever in a predetermined direction under the effect of resilient force thereof and rotational means for turning the second lever in the opposite direction against resilient force of said resilient member.

5. An image building apparatus as defined in claim 1, further including a first guide member for guiding conveying of the printing medium to contact area between the second thrust rollers and the platen, and a second guide member for guiding conveying of the printing medium to contact area between the first thrust rollers and the platen.

6. An image building apparatus as defined in claim 5, wherein said first guide member is so arranged that an angle is defined by its guide surface and the direction of conveying of the printing medium from the platen is determined smaller than 90 degrees.

7. An image building apparatus as defind in claim 5, wherein said second guide member has a curved surface at its fore end part of which radius of curvature is determined substantially same to the radius of curvature of the platen and it is adapted to move toward and away from the platen.

8. An image building apparatus as defined in claim 7, wherein the second guide member is so arranged that an angle is defined by the direction of conveying of printing medium via the printing head and the line extending tangentially from the contact position where the printing medium comes in contact with said curved surface is determined smaller than 90 degrees, when the guide member assumes the position where it is displaced away from the platen.

9. An image building apparatus as defined in claim 1, further including printing head actuating means for displacing said printing head toward and away from the platen, said printing head actuating means serving to displace the printing head away from the platen during conveying of the printing medium backwardly only when the printing medium is existent between both the first and second thrust rollers and the platen.

10. An image building apparatus as defined in claim 9, wherein said printing head actuating means comprises plural push rods of which one end is fixedly secured to the backside of the printing head, plural push levers of which free end is pivotally connected to the other end of said push rods, an actuating shaft with said push levers fixedly mounted thereon, resilient means for rotating said actuating shaft in a predetermined direction via the push levers under the effect of resilient force thereof and rotational means for rotating the actuating shaft in the opposite direction against resilient force of said resilient means.

11. An image building apparatus as defined in claim 1, further including a pair of transfer material guide members for allowing the transfer material to extend therebetween in the stretched state while it comes in contact with a part of the cylindrical surface of the platen.

12. An image building apparatus as defined in claim 11, wherein said pair of transfer material guide members are so designed that the minimum distance between the transfer material guide members and the platen is determined more than the thickness of the printing medium and substantially same to the latter.

13. An image building apparatus as defined in claim 11, wherein said pair of transfer material guide members are formed integral with the printing head.

14. An image building apparatus as defined in claim 13, wherein the pair of transfer material guide members are formed integral with the printing head by molding integral with a cover for the base board of printing head, said cover being located opposite to the platen.

15. An image building apparatus as defined in claim 14, wherein the cover includes an engagement portion adapted to be engaged to the base board to determine the position relative to the latter in the transverse direction.

16. An image building apparatus as defined in claim 13, wherein the transfer material guide members are designed in the roller-shaped configuration and they are rotatably supported by means of a pair of brackets which are fixedly secured to both the ends of the base board of the printing head as seen in the longitudinal direction by threadably engaging thereto a pluraity of set screws whereby the transfer material guide members are made integral with the printing head.

17. In an image building apparatus for building color image on printing medium by transfering thereto a plurality of coloring agents on transfer material by means of a printing head while reciprocably conveying the printing medium by rotation of a platen, the improvement comprising;

a platen for forwardly and backwardly conveying the pritning medium by the rotation of said platen while winding it partially about said platen, a printing head which comes in contact with the platen with the transfer material and the printing medium interposed therebetween so as to transfer the plurality of coloring agents on the transfer material onto the printing medium, first and second thrust roller mechanisms including first and second thrust rollers disposed upstream and downstream of said printing head as seen in the direction of conveying of the printing medium, said first and second thrust rollers being adapted to move toward the platen so as to secure the contact of the printing medium with the surface of the platen, control means for controlling said first and second thrust roller mechanisms so as to allow the thrust rollers to come in contact with the platen when the forwardly and backwardly conveyed printing medium is existent between the thrust rollers and the platen, and printing head actuating means for displacing the printing head toward and away from the platen, said printing head actuating means serving to displace the printing head away from the platen during conveying of the printing medium in the backward direction only when the printing medium is existent between both the first and second thrust rollers and the platen.

18. In an image building apparatus for building color image on paper by transfering thereto a plurality of coloring agents on thermal transfer ribbon by means of a thermal head while forwardly and backwardly conveying paper by rotation of a platen, the improvement comprising;

a platen for forwardly and backwardly conveying paper by the rotation of said platen while winding it partially about said platen, a thermal head adapted to come in contact with the platen with the thermal transfer ribbon interposed therebetween so as to transfer the plurality of coloring agents on the thermal transfer ribbon onto paper, first and second thrust roller mechanisms including first and second thrust rollers disposed upstream and downstream of said printing head as seen in the direction of conveying of paper, said first and second thrust rollers being adapted to move toward the platen so as to secure the contact of paper with the surface of the platen, a thermal head actuating mechanism for displacing the thermal head toward and away from the platen, control means for controlling said first and second thrust roller mechanisms and said thermal head actuating mechanism so as to firmly hold reciprocably movable paper at least at two points under the effect of thrust force given by the first and second thrust rollers, a pair of ribbon guides board constructed integral with the thermal head, said ribbon guides serving to bring the stretched thermal transfer ribbon in contact with a part of the cylindrical surface of the platen with paper interposed therebetween, a first paper guide member for introducing paper into the contact area between the second thrust rollers and the platen, said paper being transported in the discharging direction via the thermal head, and a second paper guide member for introducing paper into the contact area between the first thrust rollers and the platen, said paper being conveyed in the feeding direction.

* * * * *